United States Patent [19]
Meeks

[11] Patent Number: 6,083,075
[45] Date of Patent: Jul. 4, 2000

[54] ANIMAL CALL DEVICE

[76] Inventor: Paul H. Meeks, 101 Traci Dr., Tallulah, La. 71282

[21] Appl. No.: 09/060,845

[22] Filed: Apr. 15, 1998

[51] Int. Cl.[7] .............................. A63H 5/00; G10D 9/00; G10K 11/02
[52] U.S. Cl. .......................... 446/207; 446/202; 84/386; 181/182; 984/139
[58] Field of Search ..................... 446/202–209, 446/200; 84/386, 380 B; 181/127–128, 182; 984/139

[56] References Cited

U.S. PATENT DOCUMENTS

| | | |
|---|---|---|
| 1,465,675 | 4/1923 | McIntyre . |
| 1,661,525 | 3/1928 | Deerfoot . |
| 3,792,550 | 2/1974 | Crawford ................. 446/397 |
| 4,054,134 | 10/1977 | Kritzer ..................... 128/208 |
| 4,160,338 | 7/1979 | Lyons et al. ............... 446/297 |
| 4,178,829 | 12/1979 | Wolford . |
| 4,187,635 | 2/1980 | Deissler . |
| 4,612,002 | 9/1986 | Burnham ................. 446/208 |
| 4,737,130 | 4/1988 | Mann ...................... 446/207 |
| 4,832,653 | 5/1989 | Berghash et al. ........ 446/416 |
| 4,950,198 | 8/1990 | Repko, Jr. ............... 446/207 |
| 4,950,201 | 8/1990 | Sceery .................... 446/207 |
| 5,122,088 | 6/1992 | Meline .................... 446/202 |
| 5,230,649 | 7/1993 | Robertson ............... 446/204 |
| 5,234,369 | 8/1993 | Forbes et al. ........... 446/207 |
| 5,445,551 | 8/1995 | Ady ........................ 446/209 |
| 5,643,039 | 7/1997 | McIntyre ................ 446/208 |
| 5,885,125 | 3/1999 | Primos .................... 446/207 |

*Primary Examiner*—Sam Rimell
*Assistant Examiner*—Laura Fossum
*Attorney, Agent, or Firm*—Akin, Gump, Strauss, Hauer & Feld, L.L.P.

[57] ABSTRACT

An animal call device includes a sound generator part and a sound amplifier part preferably directly connected to the sound generator part for producing an amplified and reverberating or echo-like animal call signal. The sound generator part includes a mouthpiece and a vibrating reed for producing staccato so-called grunt-like acoustic vibrations, particularly for attracting deer and similar mammals. A sound emitter member of the sound generator part is connected directly to a housing for the sound amplifier part which supports, in one embodiment, two spaced apart flexible diaphragms interconnected by a tension coil spring to produce complex echo-like amplified sounds. An alternate embodiment includes a single flexible diaphragm connected to a tension coil spring and supported in a frusto-conical housing for amplifying and modifying the staccato grunt signals produced by the sound generator part.

15 Claims, 1 Drawing Sheet

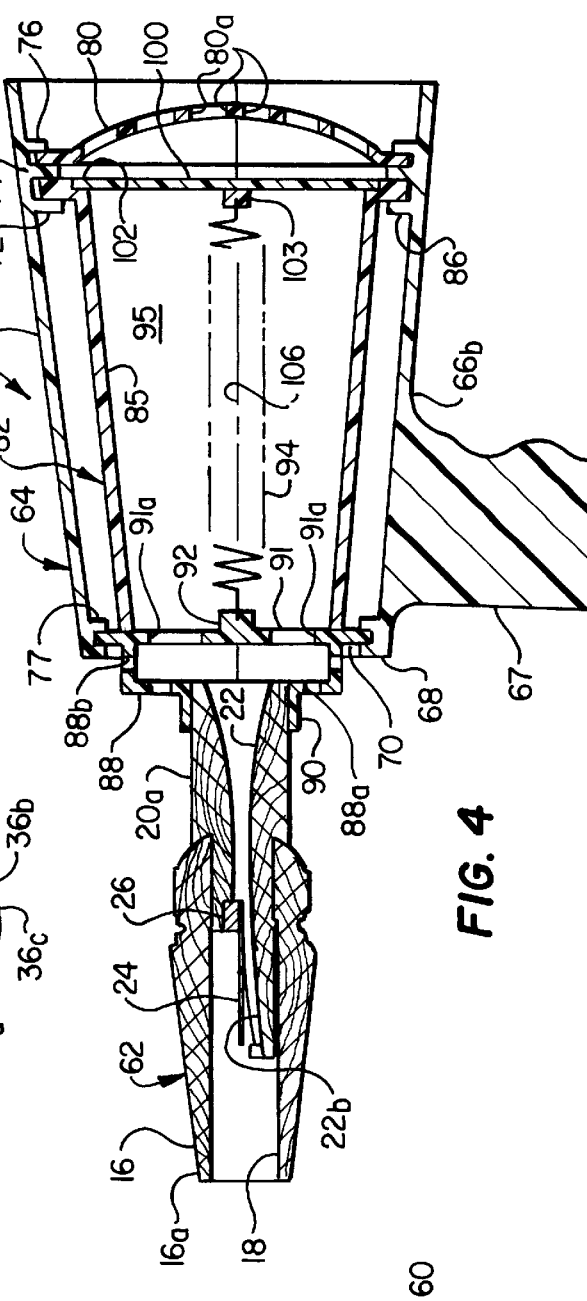
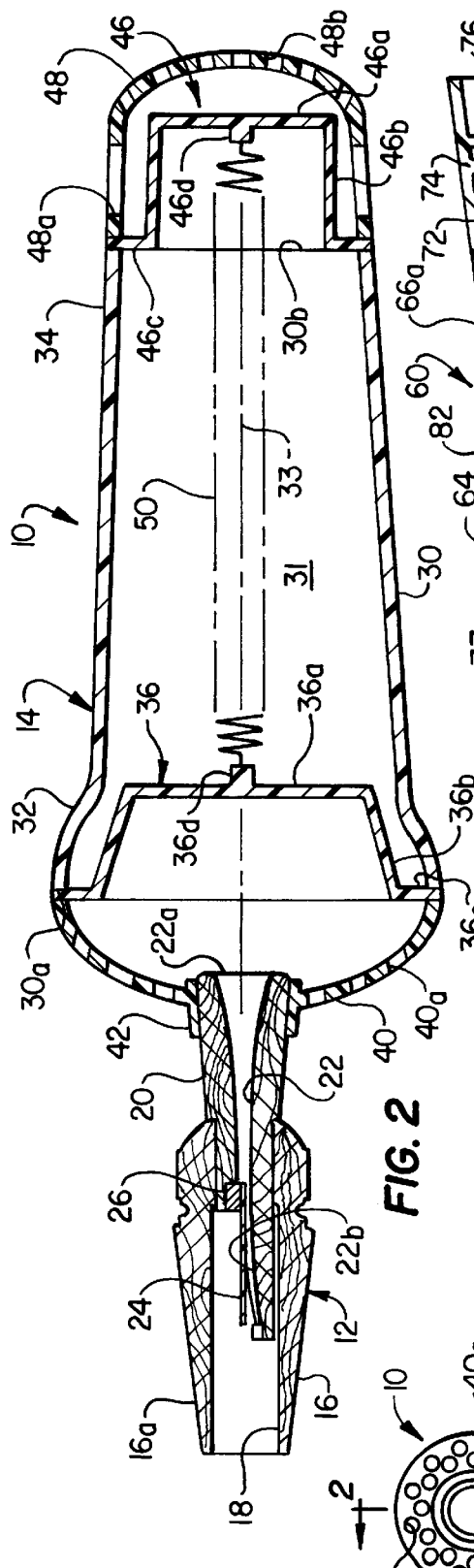
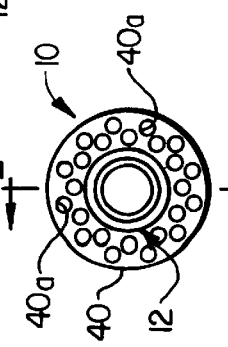

ANIMAL CALL DEVICE

FIELD OF THE INVENTION

The present invention pertains to an animal call device comprising a vibrating reed acoustic generator part in combination with single or multiple diaphragm amplifier parts and particularly useful for calling large mammals, such as deer, elk and the like.

BACKGROUND OF THE INVENTION

Hunters and herders have long sought to develop call devices which accurately imitate the sounds orally generated by certain animals so as to be able to attract or gain the attention of such animals for various purposes. One vexatious problem in developing acoustic animal call devices has been the lack of ability to accurately duplicate the sounds made by the animal in question. Large mammals such as deer, elk and the like and even certain waterfowl have oral and/or nasal cavities which tend to amplify and enhance by reverberation the sound emitted by the animal. This amplification and duplication of the actual sound made by the animal in question has been difficult to provide prior to the present invention, particularly with regard to providing a call device which will accurately simulate the sound or "grunt" generated by mammals such as deer, elk and other members of the family Cervidae.

SUMMARY OF THE INVENTION

The present invention provides an improved animal call device particularly useful for imitating the sounds generated by deer, elk and other mammals which produce a staccato grunt-like audible tone which can have an echo or reverberating effect. The present invention also provides an improved acoustic animal call device which generates a staccato sound which is amplified and enhanced by reverberation.

In accordance with one aspect of the present invention an animal call device is provided which includes a vibrating reed sound generator part whose output signal is amplified by one or more diaphragm type amplifier members. In one preferred embodiment of the invention an amplifier part of the device includes two flexible diaphragm members supported spaced apart from each other and connected by a resilient tension member to cause multiple vibrations of the diaphragm members to amplify the sound generated by the vibrating reed and to produce an echo effect or reverberation which more accurately duplicates the sounds emitted by certain animals.

The present invention still further provides an improved animal call device which is powered by pressure air generated by a person exhaling into a mouthpiece of a sound generator part of the device which includes a vibrating reed supported in proximity to a sound emitter or bell housing. The sound generator part projects acoustic vibrations toward a flexible diaphragm amplifier in such a way that improved sound is emitted which is more attractive to certain animals. The complex acoustic vibrations generated by the device of the present invention attracts animals, such as deer and the like with greater success than prior art devices.

Those skilled in the art will further appreciate the advantages and superior features of the animal call device of the invention upon reading the detailed description which follows in conjunction with the drawing.

BRIEF DESCRIPTION OF THE DRAWING

FIG. 1 is an end view of one preferred embodiment of an animal call device in accordance with the invention;

FIG. 2 is a longitudinal central section view taken generally from the line 2—2 of FIG. 1;

FIG. 3 is and end view of an alternate embodiment of an animal call device in accordance with the invention; and FIG. 4 is a longitudinal central section view taken generally from the line 4—4 of FIG. 3.

DETAILED DESCRIPTION OF THE PREFERRED EMBODIMENTS

In the description which follows like parts are marked throughout the specification and drawing with the same reference numerals, respectively. The drawing figures are not necessarily to scale and certain features may be shown in generalized or somewhat schematic form in the interest of clarity and conciseness.

Referring to FIGS. 1 and 2, there is illustrated an animal call device in accordance with the invention and generally designated by the numeral 10. The animal call device 10 includes a vibrating reed type acoustic signal or sound generator part, generally designated by the numeral 12, and a flexible diaphragm tone amplifier part, generally designated by the numeral 14.

Referring primarily to FIG. 2, the generator part 12 includes a generally cylindrical tubular mouthpiece 16 having an internal passage 18 for receiving pressure air exhaled by a person placing the end 16a of the mouthpiece to one's lips. The generator part 12 also includes a generally cylindrical tubular emitter member 20 having an internal somewhat flared or bell shaped tubular passage 22 formed therein which flares to an enlarged diameter outlet end 22a. The passage 22 terminates at its opposite end in an elongated slot 22b over which is disposed a flexible vibrating reed 24 which is suitably secured to the member 20 at one end by a retainer part 26. The reed 24 is responsive to the flow of pressure air from the inlet end of the passage 18 through the slot 22b and the passage 22 to vibrate rapidly and produce acoustic vibrations of a staccato nature. The sound or tone generator part 12 may comprise a conventional deer "grunt" type animal call commercially available. For example, the general construction of the sound generator part 12 may be somewhat similar to that described in U.S. Pat. No. 4,950,210 issued Aug. 21, 1990 to E. J. Sceery, the entire disclosure of which is incorporated herein by reference.

Referring further to FIG. 2, the amplifier part 14 comprises a somewhat frusto-conical shaped tubular housing 30 having an enlarged diameter end portion 32 and a reduced diameter end portion 34. The end portion 32 is adapted to support a generally cylindrical cup shaped flexible diaphragm 36 having a transverse bottom wall 36a, a frusto-conical peripheral sidewall 36b and a transverse peripheral flange 36c, generally parallel to and spaced from the bottom wall 36a. The diaphragm 36 is supported between the housing end face 30a and a somewhat hemispherical shaped cover member 40 having a central tubular boss portion 42 for securing the amplifier part 14 to the generator part 12 in a suitable manner whereby the device 10 comprises a substantially integral unit. The cover member 40 includes plural openings 40a circumferentially and radially spaced apart from each other with respect to a longitudinal central axis 33 of the device 10 so as to provide unencumbered emission of acoustic vibrations from diaphragm 36 to the exterior of the amplifier part 14.

Referring further to FIG. 2, the amplifier part 14 also includes a second somewhat cup-shaped diaphragm 46 which is characterized by a bottom wall 46a, a tapered or frusto-conical sidewall 46b and a transverse peripheral flange 46c generally parallel to the bottom wall 46a. The diaphragm 46 is secured to an end face 30b of the housing 30 opposite the end to which the diaphragm 36 is secured and the flange 46c is sandwiched between the housing 30 and a generally hemispherical shaped cover member 48. The cover member 48 is provided with a series of elongated, circumferentially spaced slots 48a and radially projecting openings 48b to provide for unencumbered sound emission from the diaphragm 46 to the exterior of the amplifier part 14.

As shown in FIG. 2, the diaphragms 36 and 46 are provided with generally centrally located bosses or projections 36d and 46d, respectively, to which opposite ends of a coil tension spring 50 are secured with the spring under a tensile load. In this way acoustic vibrations imparted to the diaphragm 36 are transmitted to the diaphragm 46 through the spring 50 as well as through air in the space 31 between the diaphragms, and the extensions and contractions of the spring 50 also tend to vibrate both of the diaphragms 36 and 46 in a complex manner wherein reflections and secondary excitations of the diaphragms provide a somewhat echo-like tone emitted by the amplifier part 14 which is enhanced by reverberation. Accordingly, acoustic vibrations generated by the generator part 12 impinge on the diaphragm 36 which responds by effecting vibration of itself and the diaphragm 46 through the spring 50, as well as through the air contained within the space 31 and reflections from diaphragm 46 also excite secondary vibrations in both diaphragms.

The sound generator part 12 includes the member 16 which may be made of one of several materials including various types of wood. The passage 18 has a diameter of about 0.62 inches and an overall length of about 2.62 inches. The emitter member 20 has a diameter of about 0.90 inches with a maximum diameter of the passage 22, 22a of about 0.50 inches. The reed 24 may be made of a suitable material such as nylon or the like and is about 2.0 inches in length.

The amplifier part 14 preferably has a maximum diameter of the housing 30 at the end 30a of about 3.00 inches, an overall length of 5.70 inches between the ends 30a and 30b and a diameter of the end 30b of about 2.00 inches. The amplifier part 14 may be made entirely of a suitable plastic material and the thin walled plastic diaphragms 36 and 46 have, respectively, diameters of their bottom walls 36a and 46a of about 1.75 inches and 1.00 inches. The coil spring 50 may have a wire diameter of about 0.50 inches. The components of the sound generator part 12 and the amplifier part 14 may be assembled using conventional methods such as chemical or thermal bonding of the members of the amplifier part to each other and a suitable force fit or adhesive bonding of the members 16 and 20 of the sound generator part 12 to each other using conventional methods known to those skilled in the art.

Referring now to FIGS. 3 and 4, an alternate embodiment of an animal call device in accordance with the invention is illustrated and generally designated by the numeral 60. The animal call device 60 includes a sound or tone generator part 62 substantially like the generator part 12 except for a slightly modified emitter member 20a which has a generally cylindrical outer wall rather than the tapered or flared shape of the member 20. The animal call device 60 includes a modified sound amplifier part 64, preferably comprising a two part tubular housing 66a, 66b which has a generally frusto-conical shape and, in assembly, provides a transverse end wall 68, FIG. 4, delimited by a generally cylindrical bore 70. Housing part 66b preferably includes an integral hand grip 67, as shown. The opposite end of the housing 66a, 66b is provided with circumferential inward projecting flanges 72, 74, 76 which are suitably spaced apart to retain a somewhat hemispherical shaped cover member 80 between the flanges 74 and 76 and to retain an amplifier member 82 within the generally tubular housing 66a, 66b between the flanges 72, 74 and between a flange 77 and the end wall 68, as illustrated.

The sound or tone amplifier member 82 comprises a tapered or frusto-conical shaped tubular housing member 85, the larger diameter end of which is delimited by a peripheral transverse flange 86 retained between the flanges 72 and 74 when assembled to the housing 66a, 66b. The housing member 85 also includes a transverse end wall 88 at the opposite end thereof which is provided with a suitable tubular collar portion 90 for connection to the sound generator part 62. The end wall 88 is also provided a series of circumferentially spaced openings 88a and 88b to emit sounds in a direction generally toward the generator part 62. The inlet end of the housing 85 is also, preferably, provided with an intermediate perforated wall 91 supporting a boss 92 for connection to one end of a tension coil spring 94. Suitable relatively large diameter openings 91a are provided in the intermediate wall 91 to provide uninhibited transmission of acoustic vibrations from the generator part 62 into the interior space 95 defined by the housing 85.

Referring further to FIG. 4, the amplifier part 64 includes a generally cylindrical thin-walled diaphragm 100 which is retained in a suitable annular recess 102 formed in the flange 86. The diaphragm 100 includes a central, relatively small boss portion 103 for connection of the diaphragm to the tension spring 94 at the end opposite the end which is connected to the boss 92. The diaphragm 100 is thus retained in supported relationship to the housing 85 in recess 102 by the tension spring 94 and is operable to flex in opposite directions either side of a plane normal to a longitudinal central axis 106 of the device 60 to amplify acoustic vibrations generated by the generator part 62 and transmitted to the diaphragm 100 through the space 95. Amplified acoustic signals generated by the animal call device 60 are enhanced by reverberation and emitted through openings 80a in cover member 80 as well as the openings 88a and 88b and these amplified and enhanced sounds or tone-like signals also provide an echo effect of the basic staccato call generated by the generator part 62.

The proportions of the animal call device 60 are essentially the same with respect to the sound generator part 62 as compared with the sound generator part 12. The diameter of the thin walled plastic diaphragm 100 is approximately 1.80 inches, the diameter of the housing 85 at the flange 86 is about 1.80 inches and the overall length of the housing 85 is about 2.60 inches. All of the components of the sound amplifier part 64 may be made of a suitable thermo-plastic except for the tension spring 94 which may have the same diameter and wire thickness as the spring 50 but of a shorter length to provide essentially the same tension force on the diaphragm 100, at rest, as is provided by the tension spring 50 on the diaphragms 36 and 46. The amount of tension in the springs 50 and 94, when at rest, may be varied to vary the echo characteristics of the sounds generated by the animal call devices 10 and 60, respectively.

The construction and operation of the animal call devices 10 and 60 is believed to be readily understandable to those skilled in the art from the foregoing descriptions. A user of the animal call devices 10 or 60 may impart special sound effects by the manner in which air is blown into the passage 18 to effect vibration of the reed 24. However, whatever sounds are generated by a user of the animal call devices 10 or 60, these sounds are amplified and enhanced in a unique manner which provides a more realistic signal to animals, such as deer, elk, moose, bears, and wild and domestic pigs, than heretofore achievable. Although the call devices 10 and 60 are advantageous for use in attracting deer and similar animals, other animal species, including those mentioned above, may respond favorably to acoustic signals from the call devices. Various waterfowl, so-called big game animals and common predators, including those found roaming the North American continent, may be attracted using the devices 10 and 60. Moreover, although the integrated call devices 10 and 60 are advantageous, the invention also contemplates a method of providing improved animal calls using a generator part and amplifier part which could be provided as separate components and used in conjunction with each other to provide improved acoustic vibrations audible to animals of the type mentioned hereinabove.

Although preferred embodiments of the invention have been described in detail herein those skilled in the art will recognize that various substitutions and modifications may be made without departing from the scope and spirit of the invention as defined by the appended claims.

What is claimed is:

1. An animal call device comprising:
    a sound generator part including a member responsive to the flow of air thereover to provide acoustic vibrations within the acoustic perception range of animals, including deer, a mouthpiece in airflow communication with said member for conducting airflow thereto and a sound emitter member including a passage formed therein and operable for emitting acoustic vibrations from one end of said passage; and
    a sound amplifier part connected to said sound emitter member and including a hollow tubular housing for transmitting acoustic vibrations received from said passage in said sound emitter member to at least one flexible diaphragm supported on said housing, and spring means operatively connected to said housing and said diaphragm said diaphragm being responsive to acoustic vibrations received from said sound emitter member to amplify said vibrations.

2. The animal call device set forth in claim 1 wherein:
    said spring means comprises a tension spring for modifying the vibrations of said diaphragm.

3. The animal call device set forth in claim 2 wherein:
    said diaphragm is supported on and retained in engagement with said housing by said tension spring.

4. An animal call device comprising:
    a sound generator part including a vibrating reed responsive to the flow of air thereover to provide staccato acoustic vibrations, a mouthpiece in airflow communication with said vibrating reed for conducting airflow thereto and a sound emitter member for emitting acoustic vibrations from one end thereof and generated by said vibrating reed; and
    a sound amplifier part connected to said sound generator part and including a hollow, generally frusto-conical tubular housing, a first flexible diaphragm supported on said housing, generally at one end thereof and spring means operably connected to said housing and to said first diaphragm whereby said sound amplifier part is responsive to acoustic vibrations received from said sound generator part to amplify and enhance said vibrations by reverberation.

5. The animal call device set forth in claim 4 wherein:
    said sound amplifier part includes a second flexible diaphragm supported on said housing at an end of said housing opposite said one end, said diaphragms being interconnected by said spring means, both of said diaphragms being responsive to receiving acoustic vibrations from said sound amplifier part to amplify and enhance by reverberation acoustic signals initiated by said sound generator part.

6. The animal call device set forth in claim 5 wherein:
    said spring means comprises a tension coil spring interconnecting said diaphragms.

7. A method for generating acoustic vibrations within the acoustic perception range of animals to attract same comprising:
    providing a sound generator part including a vibrating reed member responsive to the flow of air thereover to provide acoustic vibrations within said acoustic perception range of said animals, said sound generator part including a mouthpiece in airflow communication with said vibrating reed and a sound emitter member for emitting said acoustic vibrations;
    providing a sound amplifier part including a generally hollow tubular housing, a flexible diaphragm supported on said housing and spring means operatively connected to said housing and said diaphragm, said diaphragm being responsive to acoustic vibrations received from said sound generator part to amplify said vibrations;
    placing said sound emitter member adjacent to said sound amplifier part whereby acoustic vibrations generated by said vibrating reed are transmitted directly to said diaphragm to effect vibration of said diaphragm to amplify sounds generated by said sound generator part; and
    causing airflow over said vibrating reed to effect acoustic vibrations of said vibrating reed for emission from said emitter member and for amplification and enhancement by reverberation by said sound amplifier part.

8. An animal call device comprising:
    a sound generator part including a member responsive to the flow of air thereover to provide acoustic vibrations within the acoustic perception range of animals, including deer, a mouthpiece in airflow communication with said member for conducting airflow thereto and a sound emitter member for emitting acoustic vibrations from one end thereof; and
    a sound amplifier part connected to said sound generator part and including a hollow tubular housing and at least one flexible diaphragm supported on said housing and responsive to acoustic vibrations received from said sound generator part to amplify said vibrations, said diaphragm being connected to a tension spring for modifying the vibrations of said diaphragm and said diaphragm being supported on and retained in engagement with said housing by said tension spring, and said housing comprising a generally frusto-conical tubular member having a first end including a wall portion connected to said sound generator part and a second end for receiving and supporting said diaphragm.

9. An animal call device comprising:
    a sound generator part including a member responsive to the flow of air thereover to provide acoustic vibrations within the acoustic perception range of animals, including deer, a mouthpiece in airflow communication with said member for conducting airflow thereto and a sound emitter member for emitting acoustic vibrations from one end thereof; and
    a sound amplifier part connected to said sound generator part and including a hollow tubular housing and a first flexible diaphragm supported on said housing and responsive to acoustic vibrations received from said sound generator part to amplify said vibrations, said first diaphragm being connected, at one end of a tension spring which is operatively connected to said housing at another end of said spring for modifying the vibrations of said first diaphragm, and said housing comprises a generally frusto-conical tubular member having a first end supporting said first diaphragm and a second end supporting a second flexible diaphragm spaced from said first diaphragm and defining a space therebetween for transmitting acoustic vibrations therebetween.

10. The animal call device set forth in claim 9 wherein:

said tension spring extends between and is connected to both of said diaphragms.

11. The animal call device set forth in claim 10 wherein:

said diaphragms are each, somewhat cup-shaped and include a transverse bottom wall, respectively, and said tension spring is connected to a central boss part connected to said bottom walls of said diaphragms, respectively.

12. The animal call device set forth in claim 11 wherein:

one of said diaphragms is of a larger diameter than the other of said diaphragms.

13. The animal call device set forth in claim 12 wherein:

the diaphragm of larger diameter is disposed adjacent said sound emitter member of said sound generator part.

14. The animal call device set forth in claim 13 wherein:

said sound amplifier part includes a cover at one end of said housing covering one of said diaphragms and a cover at the opposite end of said housing covering the other of said diaphragms, each of said covers being perforated to provide substantially unencumbered transmission of acoustic vibrations to and from said diaphragms, respectively.

15. The animal call device set forth in claim 14 wherein:

one of said covers includes a support portion for supporting said sound generator part thereon.

* * * * *